United States Patent Office 3,343,300
Patented Sept. 26, 1967

3,343,300
EQUIPMENT FOR GREENHOUSES
Ulrich Englert, Horrheim, Wurttemberg, Germany
Filed Mar. 24, 1966, Ser. No. 537,150
2 Claims. (Cl. 47—17)

ABSTRACT OF THE DISCLOSURE

A greenhouse contains a horizontal central shaft, a pair of support wheels coaxially mounted on and spaced axially of the shaft for rotation about the axis of the shaft, a series of axially extending plant carriers pivotally mounted between said wheels and spaced radially from said central shaft in a plurality of circular series spaced at different radii from the axis of said central shaft, a plant spraying device past which the carriers move successively as the wheel rotates and which is disposed outside the orbit of said plant carriers, and means for slowly rotating said wheels to move said carriers in a circular path.

---

The invention relates to equipment for greenhouses.

At present, plants cultivated in greenhouses are located in pots or boxes on long tables between which work passages are arranged. Watering, and dusting with protective substances has therefore to be carried out from the work passage by persons who have to carry the water and the protective substances and apparatus such as watering cans and sprays. In order that light may reach all plants as uniformly as possible, space has to be wasted in ensuring that no plants in relation to a fixed light source, such as ray lamps or windows, stand in the shadow of other plants. This waste of space causes, above all, high heating costs.

All these disadvantages are overcome or reduced by equipment for greenhouses according to the present invention in that flower-pots, transplanting boxes or the like are located on carrier plates which are suspended from driven wheels on which they are driven around in circular paths.

Preferably, the equipment is so arranged that the rotary shafts of the wheels which turn slowly lie parallel to the length of the house.

Watering devices and devices for spraying the plants with protective substances can thus now be stationary just as were the light sources previously, and, due to rotation of the wheels, it is not disadvantageous that one plant lies in front of another. Apart from this, the work of tending the plants is automatically carried out, and, on account of the uniform lighting of all plants, about five times as many plants can be housed in a greenhouse than hitherto. This means, amongst other things, that only about 20% of the previous costs per plant for heating is required.

The work passages are, as hitherto, arranged between the rows of plants, that is between the wheels and parallel to their rotary shafts. Thus, there results a further great advantage in that one can load and unload the carrier plates in the neighbourhood of the lowest part of the wheel. A roller track extending along each work passage may be provided to facilitate the movement of carrier plates to and from loading and unloading positions. One can even drive along the work passages with fork loaders and hook the carrier plates with the plant holders thereon on to and from off support rods on the wheels. Thereby, further automation of the greenhouse work is made possible.

Figure 1:
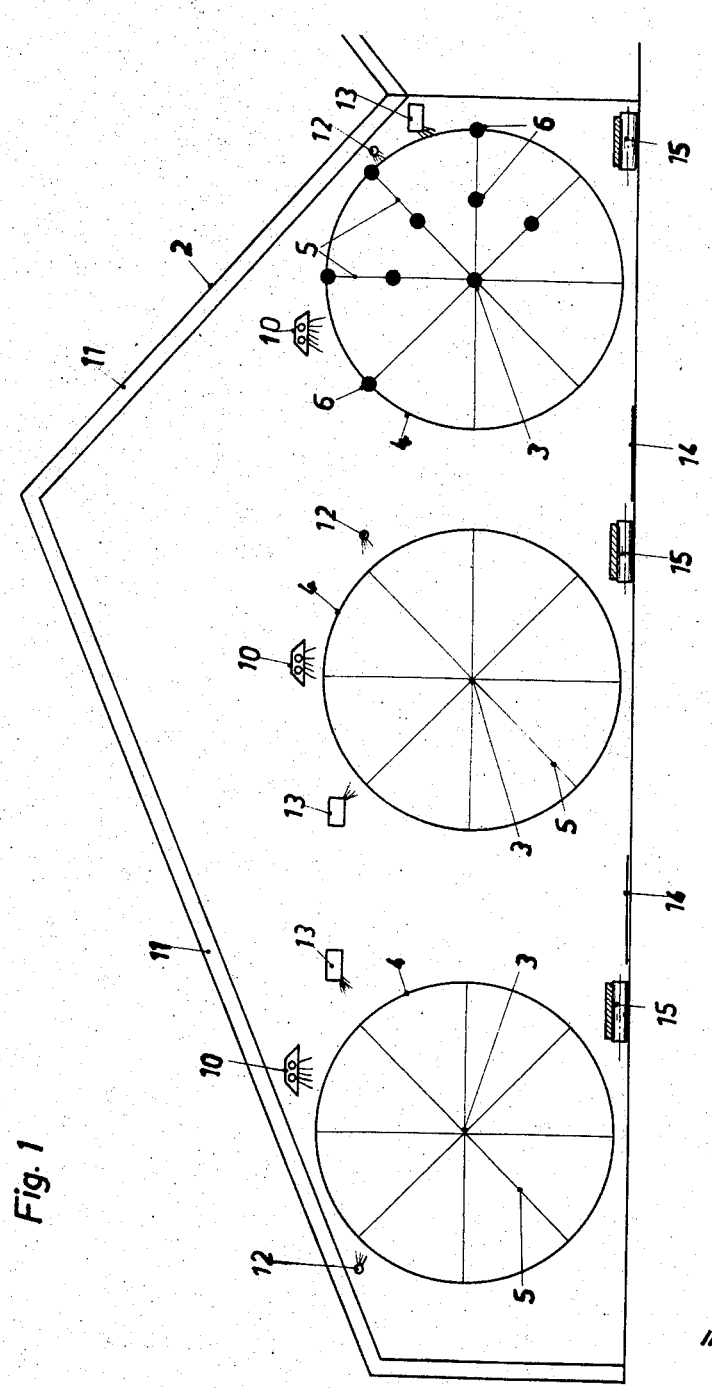
Figure 2:
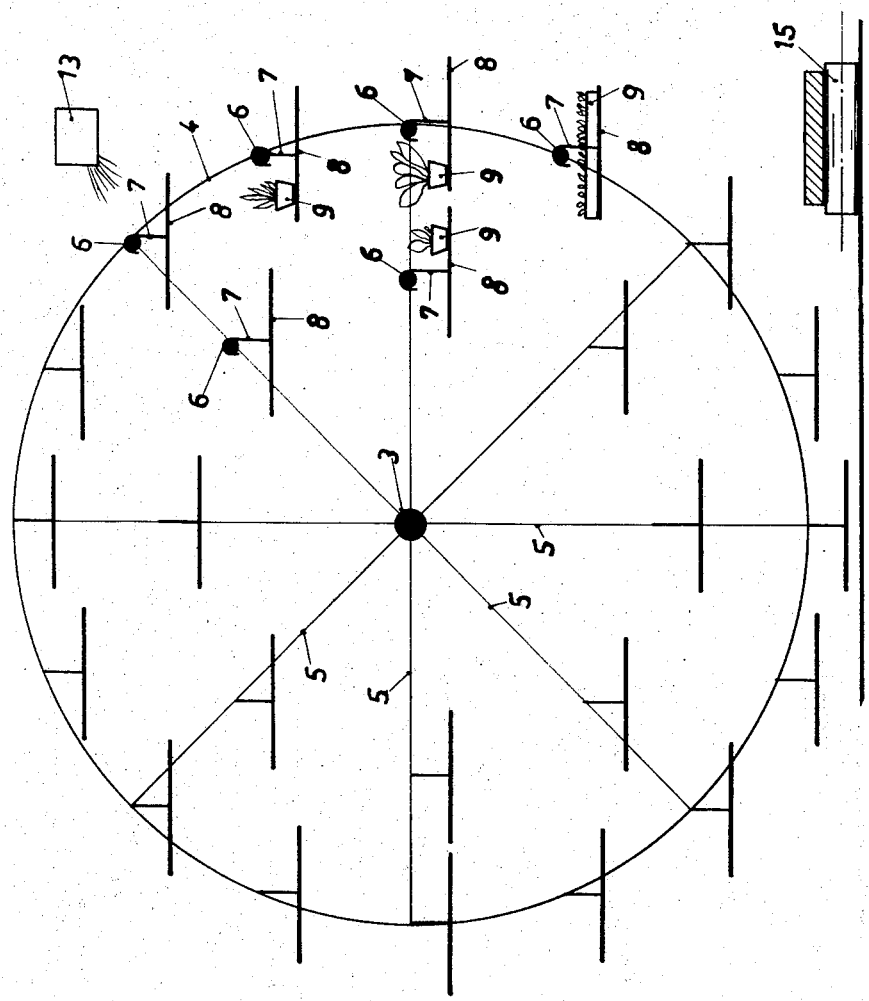

An embodiment of the invention will now be described, by way of example, with reference to the accompanying drawings, in which:

FIG. 1 is a cross sectional view of a greenhouse according to the present invention, and FIG. 2 is a cross sectional view of a wheel to an enlarged scale.

A greenhouse 2 houses a plurality of wheels 4, in this embodiment three wheels. Each wheel 4 has a shaft 3 connected to a power source, for example an electric motor, with gearing by which it is driven slowly around the axis of the shaft 3. The shafts 3 are parallel to each other and extend lengthwise of the greenhouse 2. Each wheel has a plurality of radially directed spokes 5 which are arranged in axially spaced corresponding groups, and corresponding spokes 5 in each group are connected by axially extending rods 6. The rods 6 in each wheel 4 are arranged in two circular groups at different radii from the shaft 3 and each rod 6 supports one or more carriers in the form of carrier plates 8 freely suspensed therefrom by hooks 7.

In use, plants in pots or boxes or transplanting boxes 9 are located on the plates 8, and as each wheel 4 slowly rotates, the plants are successively moved past a fixed light source such as a ray lamp 10 or windows 11, a water spraying device 12 and a device 13 for spraying protective substances such as insecticides.

The wheels 4 are preferably about two metres apart with work passages 14 between them and roller tracks 15 alongside the pasages 14, the passages 14 and tracks 15 extending axially of the wheels. During loading and unloading of the carrier plates 8 with the pots or boxes 9 thereon, the plates 8 can be pushed along the roller tracks 15 to the desired position. Unloading of the plates 8 may alternatively be effected by using a fork-lift loader which is driven along the pasages 14 to the required position. In this case, the wheel 4 is stopped and the fork passes below the plate 8 to be unloaded and lifts it so as to unhook the hooks 7 from its rod 6. Loading may be effected in substantially the reverse manner.

I claim:

1. In a greenhouse, a central shaft, a pair of support wheels coaxially mounted on and spaced axially of the shaft for rotation about the axis of the shaft, a series of axially extending plant carriers pivotally mounted between said wheels and spaced radially from said central shaft in a plurality of circular series spaced at different radii from the axis of said central shaft, a plant spraying device past which the carriers move successively as the wheel rotates and which is disposed outside the orbit of said plant carriers, and means for slowly rotating said wheels to move said carriers in a circular path.

2. Apparatus as claimed in claim 1, in which there is a plurality of wheels spaced apart side by side on opposite sides of work passages, and a roller track extends alongside each of said passages.

References Cited

UNITED STATES PATENTS

| 2,244,677 | 6/1941 | Cornell | 47—17 |
| 2,358,000 | 9/1944 | Cornell | 47—1.2 X |

FOREIGN PATENTS

| 163,369 | 6/1955 | Australia. |

ABRAHAM G. STONE, *Primary Examiner.*

ROBERT E. BAGWILL, *Examiner.*